(12) United States Patent
Murrish et al.

(10) Patent No.: US 9,970,476 B2
(45) Date of Patent: May 15, 2018

(54) CRANKSHAFT ASSEMBLY WITH CORE PLUG AND METHOD OF MANUFACTURING A CRANKSHAFT ASSEMBLY

(71) Applicant: GM GLOBAL TECHNOLOGY OPERATIONS LLC, Detroit, MI (US)

(72) Inventors: Dale E. Murrish, Troy, MI (US); John B. Fisher, Flint, MI (US); Scott A. Hucker, Ortonville, MI (US); Amit Kumar, Rochester Hills, MI (US); Balakrishna Chinta, Troy, MI (US); James Dwight Cremonesi, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 15/048,333

(22) Filed: Feb. 19, 2016

(65) Prior Publication Data
US 2017/0241473 A1   Aug. 24, 2017

(51) Int. Cl.
| | |
|---|---|
| *B22C 9/10* | (2006.01) |
| *B22D 19/00* | (2006.01) |
| *B22D 25/02* | (2006.01) |
| *B22D 29/00* | (2006.01) |
| *F16C 3/06* | (2006.01) |
| *B23B 41/00* | (2006.01) |

(52) U.S. Cl.
CPC ............... *F16C 3/06* (2013.01); *B22D 19/00* (2013.01); *B22D 25/02* (2013.01); *B22D 29/001* (2013.01); *B23B 41/00* (2013.01); *B23B 2215/20* (2013.01)

(58) Field of Classification Search
CPC ........ B22C 9/108; B22D 19/00; B22D 25/02; B22D 29/00; B22D 29/001
USPC .......................................... 164/30, 132, 369
See application file for complete search history.

(56) References Cited

U.S. PATENT DOCUMENTS

| | | |
|---|---|---|
| 4,311,406 A | 1/1982 | Driver |
| 4,615,310 A | 10/1986 | Umeha |
| 4,826,346 A | 5/1989 | Nishiura et al. |
| 4,977,793 A | 12/1990 | Husted |
| 5,163,341 A | 11/1992 | Murrish et al. |
| 5,201,247 A | 4/1993 | Maus |
| 5,273,007 A | 12/1993 | Ampferer |
| 5,327,813 A | 7/1994 | DeBell |
| 5,887,557 A | 3/1999 | Battlogg |
| 6,234,911 B1 | 5/2001 | Breese |

(Continued)

FOREIGN PATENT DOCUMENTS

| | | |
|---|---|---|
| DE | 3414259 A1 | 10/1985 |
| DE | 3516306 A1 | 11/1986 |

(Continued)

*Primary Examiner* — Kevin P Kerns
(74) *Attorney, Agent, or Firm* — Quinn IP Law

(57) ABSTRACT

A method of manufacturing a crankshaft assembly includes configuring a crankshaft with a crankpin journal having a cavity extending at least partially from a first axial side to a second axial side of the crankpin journal, and opening at at least one of the first axial side and the second axial side. The method includes disposing a core plug in the cavity. The crankshaft has a first density and the core plug may have a second density which may be less than the first density. A crankshaft assembly includes the crankshaft and the core plug.

19 Claims, 6 Drawing Sheets

(56) References Cited

U.S. PATENT DOCUMENTS

| | | |
|---|---|---|
| 6,312,340 B1 | 11/2001 | Gassen |
| 6,347,451 B1 | 2/2002 | Bloecker |
| 6,961,998 B2 | 11/2005 | Furchheim |
| 7,134,734 B2 | 11/2006 | Yamamoto |
| 7,819,099 B2 | 10/2010 | Lawrence et al. |
| 8,496,721 B2 | 7/2013 | Meusel et al. |
| 8,533,946 B2 | 9/2013 | Murrish et al. |
| 8,683,965 B2 | 4/2014 | Pierik |
| 8,807,106 B2 | 8/2014 | Johnson et al. |
| 8,904,977 B2 | 12/2014 | Werler |
| 9,050,883 B2 | 6/2015 | Shoji Machida |
| 2004/0000456 A1 | 1/2004 | Koleda |
| 2008/0115620 A1 | 5/2008 | Ueno et al. |
| 2009/0197690 A1 | 8/2009 | Lyscio |
| 2010/0154628 A1 | 6/2010 | Porta |
| 2014/0367064 A1* | 12/2014 | Murrish et al. ......... B22C 9/108 164/137 |
| 2015/0285296 A1 | 10/2015 | Simon et al. |
| 2016/0084295 A1* | 3/2016 | Murrish et al. ......... B22C 9/103 74/603 |
| 2017/0114898 A1 | 4/2017 | Hayman et al. |
| 2017/0241299 A1 | 8/2017 | Murrish et al. |
| 2017/0241471 A1 | 8/2017 | Murrish et al. |
| 2017/0241473 A1 | 8/2017 | Murrish et al. |

FOREIGN PATENT DOCUMENTS

| | | | |
|---|---|---|---|
| DE | 102005025931 A1 | 12/2006 | |
| DE | 102008032412 A1 | 1/2010 | |
| DE | 102013225865 A1 | 6/2015 | |
| DE | 102016001254 A1 | 10/2016 | |
| DE | 102015214623 A1 | 2/2017 | |
| EP | 0071994 A1 | 2/1983 | |
| JP | 55-103112 A * | 8/1980 | ............... F16C 3/08 |
| JP | 6319472 A | 1/1988 | |

* cited by examiner

CRANKSHAFT ASSEMBLY WITH CORE PLUG AND METHOD OF MANUFACTURING A CRANKSHAFT ASSEMBLY

TECHNICAL FIELD

The present teachings generally include a crankshaft assembly and a method of manufacturing a crankshaft assembly.

BACKGROUND

An engine crankshaft converts reciprocating linear movement of a piston into rotational movement about a longitudinal axis to provide torque to propel a vehicle, such as but not limited to a train, a boat, a plane, a truck, or an automobile.

The crankshaft includes at least one crankpin that is offset from the longitudinal axis, to which a reciprocating piston is attached via a connecting rod. Force applied from the piston to the crankshaft through the offset connection therebetween generates torque in the crankshaft, which rotates the crankshaft about the longitudinal axis. The crankshaft further includes at least one main bearing journal disposed concentrically about the longitudinal axis. The crankshaft is secured to an engine block at the main bearing journals. A bearing is disposed about the main bearing journal, between the crankshaft and the engine block.

In order to reduce weight of the crankshaft, the crankpins and main bearing journals may have hollow portions. The maximum volume of the hollow portions, and thus the weight reduction of the crankshaft, is limited by the stresses that must be borne by the crankshaft during engine operation. Stated differently, the crankshaft must have a sufficient thickness in order for the crankshaft to bear the stresses.

SUMMARY

Crankshaft design affects the overall packaging of the engine, and thereby the total mass of the engine. Accordingly, minimizing the size and/or mass of the crankshaft reduces the size and/or mass of the engine, which has a compounding effect on the overall size, mass and fuel economy of the vehicle.

A method of manufacturing a crankshaft assembly described herein includes configuring a crankshaft with a crankpin journal having a cavity extending at least partially from a first axial side to a second axial side of the crankpin journal, and opening at at least one of the first axial side and the second axial side. The method includes disposing a core plug in the cavity. The crankshaft has a first density and the core plug may have a different second density which may be less than the first density. By way of nonlimiting example, the crankshaft may be at least partially iron or steel, and the core plug may be at least partially aluminum, at least partially titanium, ceramic, a metal matrix, or a composite.

Accordingly, a crankshaft assembly includes a crankshaft having a crankpin journal with a cavity extending at least partially from a first axial side to a second axial side of the crankpin journal. The cavity opens at at least one of the first axial side and the second axial side. The crankshaft assembly includes a core plug disposed in the cavity. The crankshaft has a first density and the core plug may have a different second density which may be less than the first density.

The cavity with a core plug disposed therein may be made larger than if the cavity were hollow because the core plug partially bears loading of the crankpin journal. Less of the more dense crankshaft material is thus required. The crankpin journal together with the core plug has a lower overall weight than a crankpin journal of the same material but with a completely hollow cavity in the crankpin journal. This allows a reduction in weight and/or size of counterweights, which in turn may allow a lower deck height of an engine that includes the crank assembly.

In various embodiments, the method may include casting or forging the crankshaft. In one embodiment, when the crankshaft is forged, the cavity may be drilled in the forged crankshaft. In another embodiment, when the crankshaft is cast, the core plug can be cast into the cavity by positioning the core plug in a mold in which the crankshaft is cast. In such an embodiment, the crankshaft is cast around the core plug, and, optionally, a temporary core that is sand or wax. The core plug will remain in the casting while the temporary core is removed. In another embodiment, a temporary core, such as a sand core or wax core, can be inserted in the mold when the crankshaft is cast in order to form the cavity. After the crankshaft is cast, the core is removed and the core plug thereafter inserted in the cavity by casting or press fit insertion.

The core plug may have various shapes, and may include one or more openings extending into the core plug that reduce the weight of the core plug. In some embodiments, the opening(s) extend through only a portion of the core plug, and the remainder of the core plug is solid, optionally with a fluid passage extending therethrough that passes a fluid, such as oil, from an adjacent main bearing journal to the pin bearing journal. In various embodiments, the core plug may be a single cast piece, a single extruded piece, or multiple pieces in order to achieve a desired geometry.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
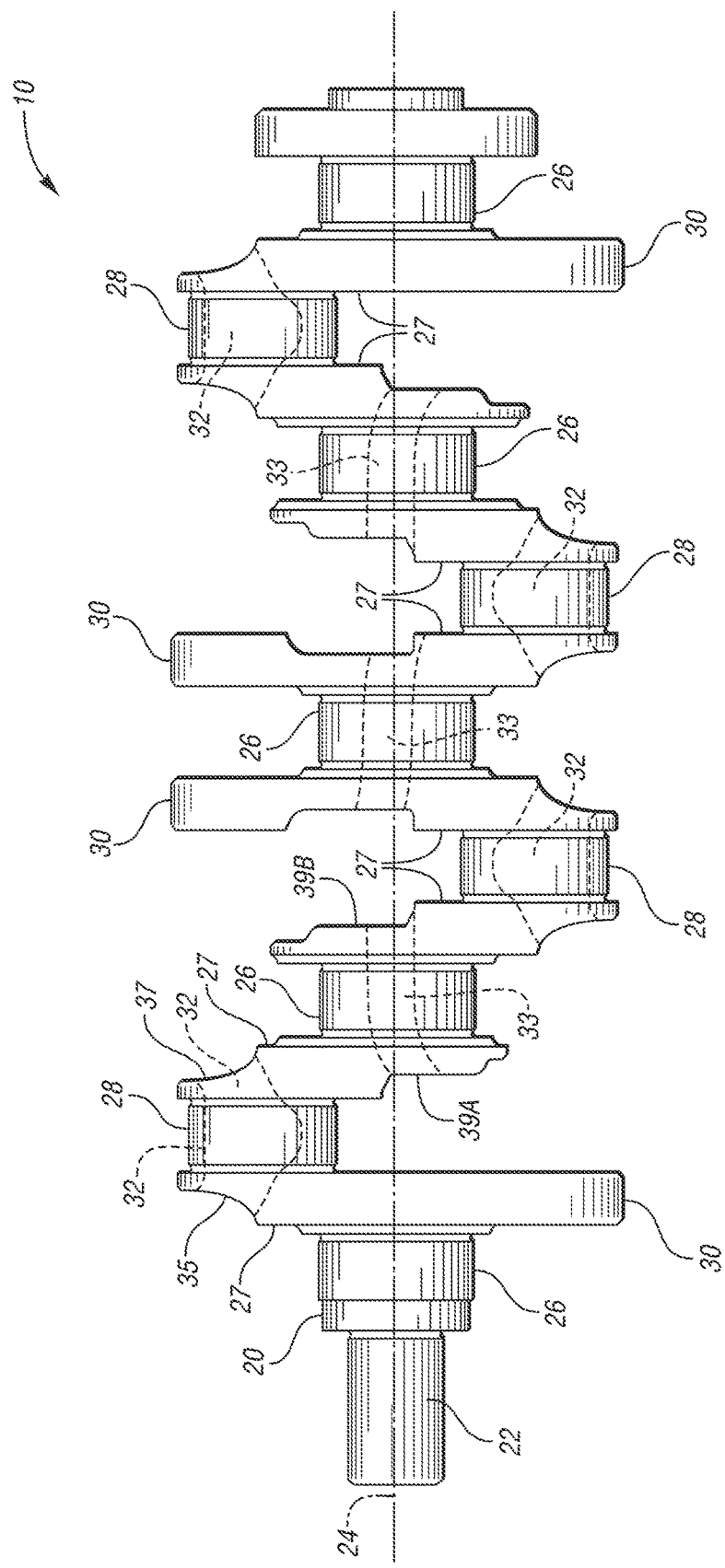
FIG. 1 is a schematic illustration in side view of a crankshaft assembly showing cavities in pin and main bearing journals with hidden lines.
Figure 2:
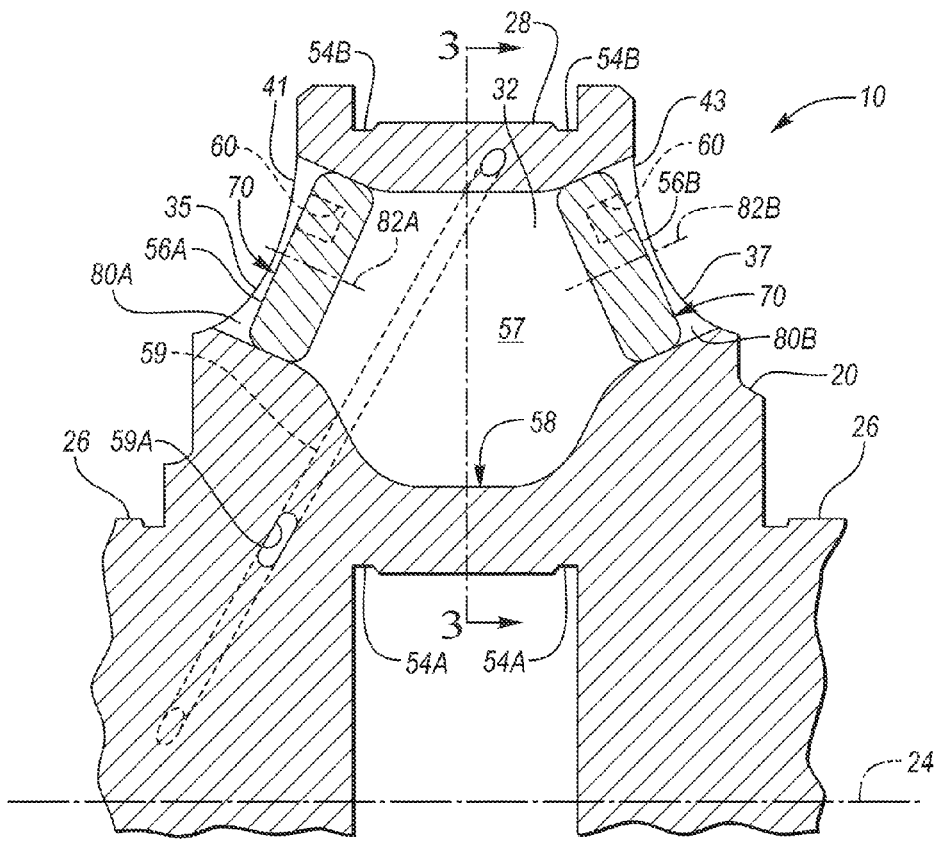
FIG. 2 is a schematic cross-sectional and fragmentary illustration of one of the pin bearing journals of FIG. 1.

Referring to the Figures, wherein like numerals indicate like parts throughout the several views, FIG. 1 shows a crankshaft assembly 10 that includes a crankshaft 20 and one or more core plugs such as core plugs 56A, 56B shown in FIG. 2, or any of the other core plug embodiments disclosed herein. The crankshaft assembly 10 may be configured for an engine, such as but not limited to a gasoline engine or a diesel engine, a compressor, or some other similar device. The crankshaft 20 includes a shaft 22 extending along a longitudinal axis 24 that defines a plurality of main bearing journals 26, a plurality of arms 27, a plurality of pin bearing journals 28, and at least one counterweight 30.

The main bearing journals 26 are disposed concentrically about the longitudinal axis 24. Each of the pin bearing journals 28 is laterally offset from the longitudinal axis 24, and is attached to the main bearing journals 26 by a pair of the arms 27. Each of the arms 27 extends from one of the main bearing journals 26 to one of the pin bearing journals 28, and may or may not include one of the counterweights 30. Each of the counterweights 30 extends radially away from the longitudinal axis 24. Each of the main bearing journals 26 supports a bearing (not shown) thereabout, and provides an attachment location for attaching the crankshaft 20 to an engine block (not shown). Each of the pin bearing journals 28 supports a bearing (not shown) thereabout, to which a connecting rod (not shown) is attached. The connecting rod attaches a piston (not shown) to the crankshaft 20. The counterweights 30 offset the reciprocating mass of the pistons, piston rings, piston pins and retaining clips, the small ends of the connecting rods, the rotating mass of the connecting rod large ends and bearings, and the rotating mass of the crankshaft itself (the pin bearing journals 28 and the arms 27). The main bearing journals 26 are on the longitudinal axis 24 and do not require any counterweights. The counterweights 30 reduce the forces acting on the main bearing journals 26 and thereby improve the durability of the bearings. The counterweights 30 balance the rotation of the crankshaft 20 about the longitudinal axis 24 to reduce vibration therein.

The embodiment of the crankshaft 20 shown in FIG. 1 is for an inline four cylinder engine, and includes four pin bearing journals 28, eight arms 27, five main bearing journals 26, and four counterweights 30. However, it should be appreciated that the crankshaft 20 may be configured differently than shown in FIG. 1. As such, the crankshaft 20 may be configured for any style and/or configuration of engine, including but not limited to a V style engine (e.g., an engine having two banks of cylinders arranged in a V to form a valley therebetween) having six or eight cylinders, or an inline style of engine having 3, 5, 6 or some other number of cylinders. The crankshaft may be a shared-pin V crankshaft, which has two rods per crankpin journal such as a V8 or V12 engine. The crankshaft may be a V crankshaft with a "flying arm" in between the two rod journals. V6 engines have four main bearings and two rods between each main bearing. A 60 degree (bank angle between cylinders) V6 crankshaft has a thick flying arm between crankpins since there is a 60 degree pin splay, and a 90 degree V6 crank has a thinner flying arm (only a 30 degree pin splay in the end view). Furthermore, since the arms 27 are structural parts of the crankshaft 20 and the counterweights 30 are merely there to reduce forces and vibrations, the crankshaft 20 may have any number of counterweights 30 attached to the various arms 27 in any configuration. For example, an in-line four cylinder crankshaft may include six or eight counterweights. Accordingly, the specific crankshaft 20 shown in FIG. 1 and other crankshafts shown and described herein are merely exemplary, and should not be considered as limiting the scope of the claims.

At least one of the pin bearing journals 28 includes a cavity 32 extending at least partially from a first axial side 35 to a second axial side 37 of the pin bearing journal 28. At least one of the main bearing journals 26 may also include a cavity 33 extending therethrough. Each of the cavities 32 in the pin bearing journals 28 and the cavities 33 in the main bearing journals 26 extends generally along the longitudinal axis 24, as described in greater detail below, but not necessarily parallel to the longitudinal axis 24. In the embodiment shown, each cavity 32 that extends through the respective pin bearing journal 28 is formed to extend completely through the respective pin bearing journal 28, between the first axial side 35 of the respective pin bearing journal 28 and the second axial side 37 of the respective pin bearing journal 28 along the longitudinal axis 24 of the crankshaft 20. Similarly, each cavity 33 that extends through the respective main bearing journal 26 is formed to extend completely through the respective main bearing journal 26, between a first axial side 39A of the respective main bearing journal 26 and a second axial side 39B of the respective main bearing journal 26 along the longitudinal axis 24 of the crankshaft 20. The cavities 32, 33 in the crankshaft 20 reduce the volume of metal used to form the crankshaft 20, thereby reducing the overall weight of the crankshaft 20. Furthermore, by reducing the weight of the pin bearing journals 28, which are laterally offset from the longitudinal axis 24, the mass of the counterweights 30 may also be reduced a corresponding amount, thereby further reducing the overall weight of the crankshaft 20.

However, there is a limit to the volume of a hollow cavity in a pin bearing journal. A hollow cavity is an empty cavity filled with air. When a pin bearing journal has a hollow cavity, the remaining material of the crankshaft must be sufficient to withstand high stresses experienced at the pin bearing journal due to loading by the connecting rods. For example, with reference to FIG. 2, the crankshaft 20 must bear stresses such that the magnitude of the stresses at the typically high stress areas at lower fillets 54A and at upper fillets 54B are not above predetermined maximum stress levels. Accordingly, in order to permit a further reduction in the relatively high density material of the crankshaft 20, one or more core plugs 56A, 56B are housed in the cavity 32 of at least one of the pin bearing journals 28. The core plugs 56A, 56B may be of a material that has a density less than the density of the material of the crankshaft 20 or may be the same material as the crankshaft. Accordingly, even with the additional weight of the core plugs 56A, 56B in the cavity 32, because the cavity 32 can be larger in comparison to a crankshaft with a completely empty cavity 32, the overall weight of the crankshaft assembly 10 is reduced.

The crankshaft 20 is configured so that the cavity 32 extends from the first axial side 35 to the second axial side 37 completely through the pin bearing journal 28 and opens and at both the first axial side 35 and the second axle side 37 at openings 41 and 43, respectively. Core plugs 56A and 56B are disposed in a cavity 32 by inserting the first core plug 56A into the cavity 32 at the first axial side 35 and the second core plug 56B into the cavity 32 at the second axial side 37 such that a midportion 57 of the cavity 32 between the core plug 56A and 56B remains hollow. Because the core plugs 56A, 56B bear some of the loading, the volume of the cavity 32 can be made larger than otherwise. For example, a lower surface 58 of the pin bearing journal 28 within a cavity 32 is lower than if the cavity 32 were completely hollow (i.e., without core plugs 56A, 56B). The mass of the crankshaft 20 is less than it would need to be if the cavity 32 were hollow. Additionally, because the core plugs 56A, 56B may be of a lower second density than the crankshaft 20, the overall weight of the crankshaft 20 without the core plugs 56A, 56B may be further decreased.

The crankshaft 20 is a first material that has a first density, and the core plugs 56A and 56B may be a second material that has a second density less than the first density. For example the crankshaft 20 may be at least partially iron or steel. The core plugs 56A, 56B may be at least partially iron or steel if they are smaller in volume than the volume of the cavity 32. The core plugs 56A, 56B may be at least partially aluminum, at least partially titanium, ceramic, a metal matrix, or a composite. As used herein, a "composite" when used to describe a component, such as a core plug, is a material that is a composite of a polymer and another material. For example, a composite may be a glass-reinforced nylon, a glass-reinforced Acrylonitrile Butadiene Styrene (ABS), a glass-filled thermoset, a glass-filled Polybutylene Terephthalate (PBT), a glass-filled Polyethylene terephthalate (PET), or other polymer composite. Other materials may be used within the scope of the present teachings.

Figure 3:
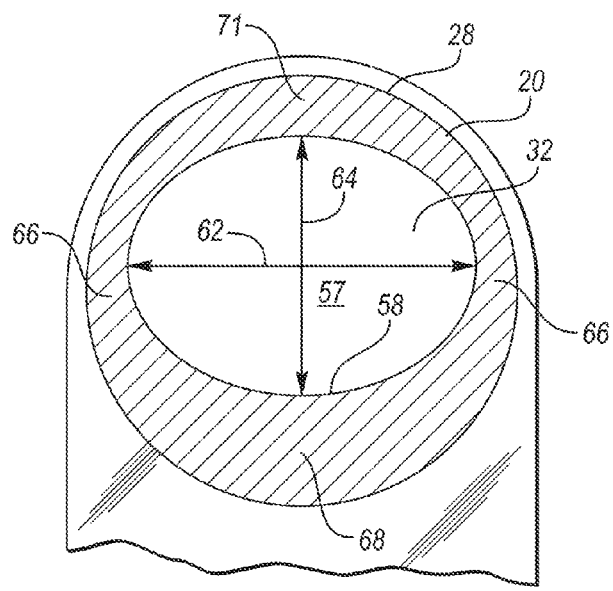
FIG. 3 is a schematic cross-sectional and fragmentary illustration of the pin bearing journal of FIG. 2 taken at lines 3-3 in FIG. 2.

As shown in FIG. 3, the midportion 57 of the cavity 32 has a cross-sectional shape that is a non-circular shape at a cross-section perpendicular to the longitudinal axis 24 of the crankshaft 20. For example, in the embodiment shown, the cross-sectional shape is an oval. Notably, the crankshaft 20 is generally thicker in the area adjacent to the lower fillets 54A than the area adjacent the upper fillets 54B. Stated differently, the oval midportion 57 of the cavity 32 is centered closer to the upper fillets 54B than the lower fillets 54A. In other embodiments, the cross-sectional shape of the cavity 32 at the midportion 57 may include but is not limited to other non-circular shapes. As shown in FIG. 3, the oval cross sectional shape of the midportion 57 includes a major axis 62 and a minor axis 64. The major axis 62 is larger than the minor axis 64. Side portions 66 of the crankpin journal 28 outward of the cavity 32 are narrower than a lower portion 68 and an upper portion 71. Additionally, the lower portion 68 is wider than the upper portion 71. The elliptical shape of the cavity 32 maximizes the reduction in material used to form the crankshaft 20, thereby maximizing the reduction in weight of the crankshaft 20. A drilled fluid passage 59 extends from the pin bearing journal 28, around or across the cavity 32, and to the main bearing journal 26. An opening 59A appears due to the cross-section taken.

The core plugs 56A, 56B themselves may also be configured to reduce overall weight while providing loading support. For example, either or both of the core plugs 56A, 56B may have a least one opening 60 that extends lengthwise at least partially through the respective core plug 56A, 56B. The at least one opening 60 is hollow, thereby reducing the weight of the core plugs 56A, 56B.

Figure 4:
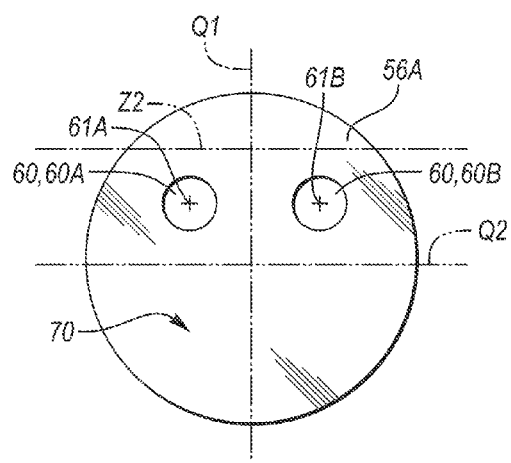
FIG. 4 is a front view of a first embodiment of a core plug for the pin bearing journal of FIG. 2.

FIG. 4 is an end view of the core plug 56A. The core plug 56A has two openings 60, including a first opening 60A and a second opening 60B both extending lengthwise partially through the core plug 56A. The openings 60A and 60B are both of a substantially circular cross-sectional shape at a cross-section taken generally perpendicular to a center axis 61A, 61B running lengthwise through the respective opening 60A, 60B. The openings 60A, 60B open only at the outward face 70 of the respective core plugs 56A, 56B. The openings 60A and 60B are the only openings in the core plugs 56A, 56B, are of equal size, and are symmetrically positioned in adjacent quadrants of the core plug 56A, 56B as illustrated with respect to core plug 56A in FIG. 4. Phantom lines Q1 and Q2 represent boundary lines that separate the core plug 56A into quadrants. To best withstand combustion forces and meet bending, ovality, and stress constraints, the core plugs 56A, 56B are fixed in the cavity 32 such that the first and the second openings 60A, 60B are positioned in a half of the core plug 56A, 56B nearest the upper fillets 54B. When positioned in this manner, the bottom half of the core plug 56A, 56B (below line Q2 in FIG. 4) is highly compressed, leading to large compressive stresses while a top portion above the openings 60A, 60B experiences tensile stresses of lower magnitude. The zone in compression falls mainly below phantom line Q2. The zone in tension falls mainly above phantom line Z2. The openings 60A, 60B are in a neutral zone between lines Q2 and Z2 that experiences relatively low stress in comparison to the zone of compressive stress and the zone of tensile stress. By positioning the openings 60A, 60B between the compressive zone and the tensile zone, weight reduction and an open volume for potential thermal expansion may be achieved with minimal impact on bending and ovality.

Figure 5:
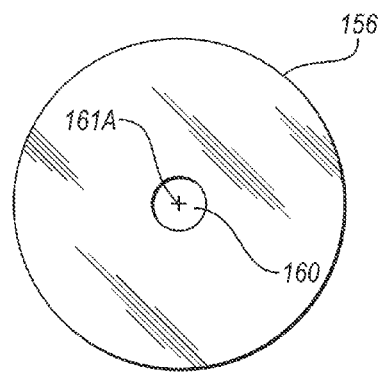
FIG. 5 is a front view of a second embodiment of a core plug for the pin bearing journal of FIG. 2.
Figure 6:
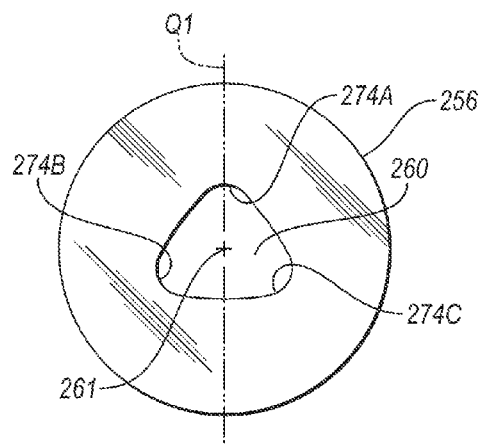
FIG. 6 is a front view of a third embodiment of a core plug for the pin bearing journal of FIG. 2.

The optional opening or openings 60 in the core plugs 56A, 56B may have a variety of other shapes. FIG. 5 shows an alternative core plug 156 with a single central opening 160 that has a substantially circular cross-sectional shape at a cross-section taken generally perpendicular to a center axis 161A running lengthwise through the opening 160. FIG. 6 shows an alternative core plug 256 with a single opening 260 extending lengthwise at least partially through the core plug 256. The opening 260 has a substantially triangular cross-sectional shape at a cross-section taken generally perpendicular to a center axis 261 running lengthwise through the opening 260. The opening 260 may be referred to as a tri-lobe shape as it has three rounded corners 274A, 274B, and 274C. To best withstand combustion forces and meet bending, ovality, and stress constraints, the core plug 256 should be fixed in the cavity 32 such that the opening 260 is symmetrical about the phantom boundary Q1 perpendicular to the axis 261, with a first of the rounded corners 274A intersected by the boundary Q1 and positioned in a half of the core plug 256 under tensile loading during combustion.

Figure 7:
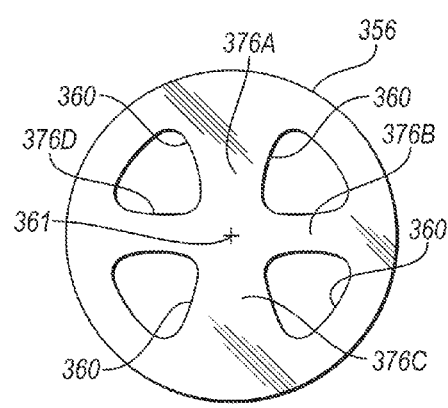
FIG. 7 is a front view of a fourth embodiment of a core plug for the pin bearing journal of FIG. 2.
Figure 12:
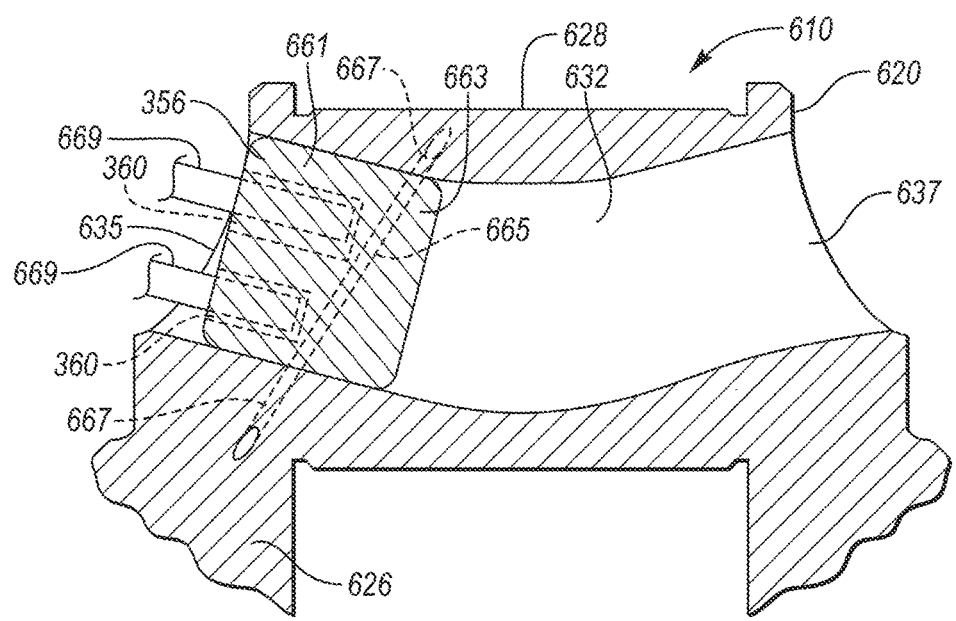
FIG. 12 is a schematic cross-sectional and fragmentary illustration of a pin bearing journal of another embodiment of a crankshaft assembly with another embodiment of a core plug being inserted in a cavity of the pin bearing journal using mandrels.

FIG. 7 illustrates an alternative embodiment of a core plug 356 that has multiple openings 360 such that the core plug 356 has spokes 376A, 376B, 376C, 376D equally spaced from one another in the core plug 356 and extending outward from a center axis 361. FIG. 7 is a cross-section taken generally perpendicular to the center axis 361. The core plug 356 is also shown in FIG. 12. Each of the spokes 376A, 376B, 376C, 376D may be larger at an outer end than at an inner end, as shown. Optionally, the spokes 376A, 376B, 376C, 376D may be configured so that two of the spokes 376A, 376C arranged generally vertically in the view of FIG. 4 are thicker than the remaining spokes, and are larger at an outer end than at an inner end. Such a core plug 356 best withstands forces during operation of the crankshaft assembly 10 when inserted in the cavity 32 so that the spokes 376A, 376C are in a vertical position, due to their greater width and their larger outer ends.

Figure 8:
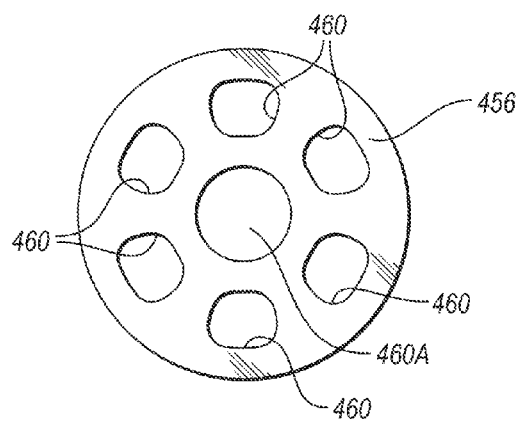
FIG. 8 is a front view of a fifth embodiment of a core plug for the pin bearing journal of FIG. 2.

FIG. 8 illustrates another alternative embodiment of a core plug 456 that may be disposed in the cavity 32. The core plug 456 has a central opening 460A and multiple openings 460 generally arranged in a honeycomb pattern. The openings 460 may have other shapes within the scope of the present teachings.

Figure 9:
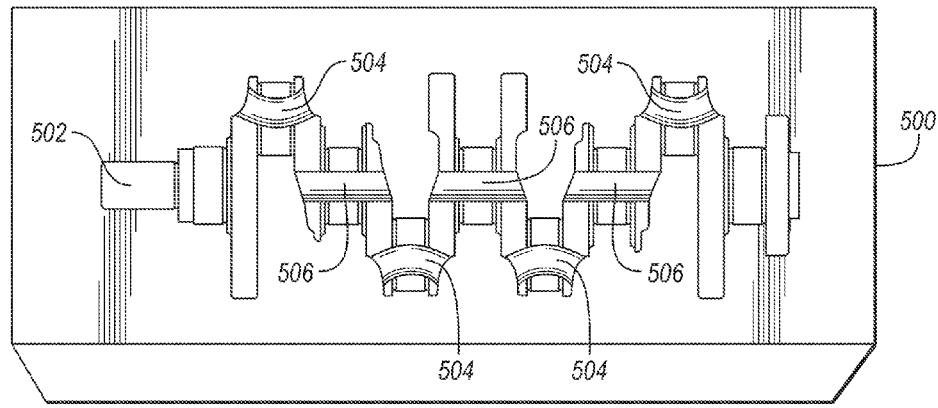
FIG. 9 is a schematic perspective illustration of a mold half of a mold assembly for casting the crankshaft of FIG. 1 and showing cores in the mold half.

A crankshaft having a cavity in a crankpin journal with a core plug disposed therein as described can be manufactured in a variety of ways. For example, the crankshaft 20 of FIG. 1 may be cast in a crankshaft mold. With reference to FIG. 9, a mold half 500 with a mold cavity 502 having the exterior shape of the crankshaft 20 is shown. Another mold half (not shown) that is a mirror image of the mold half 500 is used to complete the cast shape of the crankshaft 20. The mold halves may be formed by pressing a template defining half of the desired finished exterior shape of the crankshaft 20 into a form of green sand or some other suitable medium, thereby leaving a negative imprint of that half of the crankshaft 20 therein. Upon combining the mold halves together to form the mold, the negative imprints therein adjoin to complete the cavity that defines the exterior shape of the crankshaft 20. The exterior shape of the crankshaft 20 includes the exterior shape of the entire outer surface of the crankshaft 20 including the exterior shape of the pin bearing journals 28, the arms 27, the main bearing journals 26, and the counterweights 30.

Cores 504 that have the shape of the cavities 32, and cores 506 that have the shape of the cavities 33 are inserted into the cavity 502 thus ensuring that the cavities 32, 33 are not filled by the molten metal poured into the cavity 502 when the crankshaft 20 is cast. When the other mold half is closed together with the mold half 500, the cores 504, 506 are enclosed in the mated mold halves. The cores 504, 506 may be formed, for example, through a sand molding process as is understood by those skilled in the art for forming voids in castings.

Once the cores 504, 506 are positioned within the cavity 502 and the mold half 500 is secured relative to the other mold half, the material of the crankshaft 20 in the form of molten metal is introduced into the cavity 502 and flows around the cores 504, 506 to form the crankshaft 20. The molten metal is allowed to cool and solidify. The mold halves are then separated, thereby exposing the cast crankshaft 20. The cores 504, 506 are then removed from the crankshaft 20 by breaking, chipping, and/or flushing away the material forming the cores 504, 506, thereby leaving the crankshaft 20 with hollow cavities 32, 33. In still another embodiment, the core plug(s) and a partial, temporary core (such as a sand core) are placed in the cavity 502 prior to introducing the molten metal into the cavity 502. After the metal cools and solidifies and the mold halves are separated, the temporary core is removed and the core plug remains. The removal of the temporary core creates a hollow cavity adjacent to the core plug.

Referring again to FIG. 2, in an embodiment in which the core plugs 56A, 56B are inserted after the cavities 32, 33 are formed, because the dimensional tolerance of a cast surface is generally too large to ensure a sufficiently tight fit of the core plugs 56A, 56B in the cavity 32, the cavity 32 is machined at the openings 41, 43 such that the openings are substantially round. End portions 80A, 80B of the cavity 32 at the first and second axial sides 35, 37, respectively, are thus substantially circular in cross section along a respective center axis 82A, 82B of the end portions 80A, 80B. The crankshaft 20 is machined at the openings 41, 43, the core plugs 56A, 56B are then disposed in the cavity 32 by inserting the first core plug 56A into the end portion 80A of the cavity 32 at the first axial side 35, and by inserting the second core plug 56B into the end portion 80B of the cavity 32 at the second axial side 37. Each of the core plugs 56A, 56B has a substantially circular outer periphery to ensure a tight interference fit to the crankshaft 20.

Figures 10, 11:
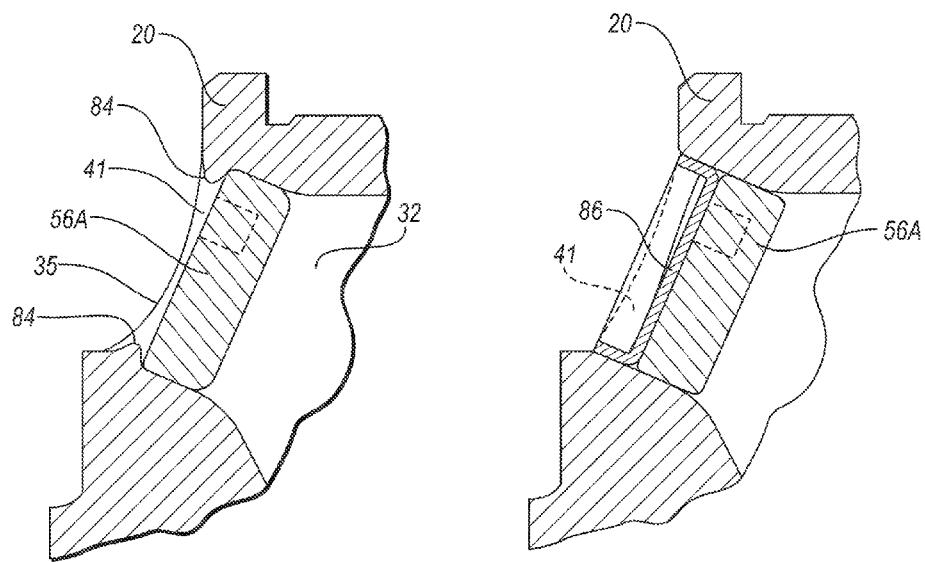
FIG. 10 is a schematic cross-sectional and fragmentary illustration of one of the pin bearing journals of FIG. 1 staked at the core plug.
FIG. 11 is a schematic cross-sectional and fragmentary illustration of one of the pin bearing journals of FIG. 1 with a cup plug retaining the core plug.

The core plugs 56A, 56B are thus secured within the cavity 32 due to an interference fit between the core plugs 56A, 56B and the machined round inner surface of the cavity 32 at the end portions 80A, 80B. Additional means can be used to further secure the core plugs 56A, 56B in the positions shown within the cavity 32 to withstand the high rotational speeds and forces borne by the crankshaft assembly 10 during use. For example, FIG. 10 shows that the core plug 56A may be retained by deforming the crankshaft 20 at the first axial opening 41 by forcing the material inward at various locations at the outermost extent of the generally round machined opening to form stakes 84. Alternatively, cup plugs 86 may be inserted at the axial sides 35, 37 in the openings 41, 43 (one cup plug 86 is shown in opening 41 in FIG. 11) outward of the core plugs 56A, 56B. An identical cup plug 86 would be inserted in opening 43. The cup plugs 86 may be metal, rubber or another material, and may be press fitted into the openings 41, 43.

FIG. 12 shows a portion of another embodiment of a crankshaft assembly 610 that includes a crankshaft 620 configured with a crankpin journal 628. Only one crankpin journal 628 is shown in the fragmentary cross-sectional view of FIG. 12. The crankshaft 620 has multiple crankpin journals 628. The crankpin journal 628 is wider than the crankpin journal 28 of FIG. 1, as the crankshaft 620 may be a shared pin crankshaft such as for a V-8 or V-12 engine, in which two connecting rods are supported at each crankpin journal 628. The crankpin journal 628 has a cavity 632 extending completely therethrough from a first axial side 635 to a second axial side 637 of the crankpin journal 628. The cavity 632 opens at both of the first axial side 635 and the second axial side 637 in the embodiment shown. The crankshaft 620 may be formed by any of the methods described herein, such as by casting or forging. The cavity 632 may be formed by any of the methods described herein, such as by casting and then machining the cast openings at the first and second axial sides 635, 637 so that the openings are round, or by drilling the cavity 632.

The core plug 356 of FIG. 7 is disposed in the cavity 632 at the first axial side 635 as shown in FIG. 12. Although only one core plug 356 is shown, a second core plug the same as or different than the first core plug 356 can be disposed at the second axial side 637. The first and second core plugs can be configured so that a midportion of the cavity 632 between the core plugs 356 remains hollow. Like the crankshaft assembly 10, the crankshaft 620 of the crankshaft assembly 610 is of a first material having a first density, and the core plug 356 is of a second material having a second density which may be less than the first density.

In the cross-sectional view of FIG. 12 taken along a vertical axis through the center axis 361 of the core plug 356, only two of the openings 360 are shown in hidden view. The openings 360 of FIG. 7 extend lengthwise only through a first portion 661 of the core plug 356, and terminate without extending into a second portion 663 of the core plug 356. Additionally, the upper opening 360 extends further than the lower opening 360. The two other openings 360 not shown in the cross-section of FIG. 12 are configured in this manner as well. The second portion 663 includes a portion 665 of a fluid passage 665, 667. The portion 665 of the fluid passage 665, 667 may be drilled or cast in the core plug 356 prior to disposing the core plug 356 in the cavity 632, in which case the portion 665 of the passage is aligned with a position in the pin bearing journal 626 through which a remainder 667 of the fluid passage will be drilled.

As illustrated in FIG. 12, disposing the core plug 356 in the cavity 632 comprises positioning the core plug 356 on at least one mandrel pin 669 that extends into at least one opening 360 in the core plug 356. Disposing the core plug 356 in the cavity 632 also includes pressing the core plug 356 into the cavity 632 by guiding the at least one mandrel pin 669 with the core plug 356 thereon into the cavity 632. In the embodiment shown, four mandrel pins 669 can be used, one in each opening 360. Only two mandrel pins 669 are visible in the cross section of FIG. 12. In another embodiment, such as if the core plug 56A of FIG. 4 is inserted into the cavity 632 using mandrels, only two mandrels would be used as there are only two openings 60A, 60B. Once the core plug 356 is inserted at a desired position within the cavity 632, the mandrel pins 669 are withdrawn from the openings 360. The core plug used may be aluminum, titanium, or another material. For purposes of non-limiting example only, the core plug 56A of FIG. 4 may be used if the core plug is aluminum, and the core plug 356 of FIG. 7 may be used if stresses are sufficiently low for aluminum or if the core plug is titanium.

The fluid passage can then be drilled including the remainder 667 and, if not pre-drilled, the portion 665. If the portion 665 is pre-drilled, then the remainder 667 of the fluid passage 667 drilled through the crankshaft 620 is aligned with the portion of the fluid passage 665 that extends through the core plug 356. Additionally, the portion 665 may have a larger diameter than the remainder 667 so that the drill easily passes through the portion 665 when drilling from the crankpin journal 628 to the crankshaft journal 626.

Figure 13:
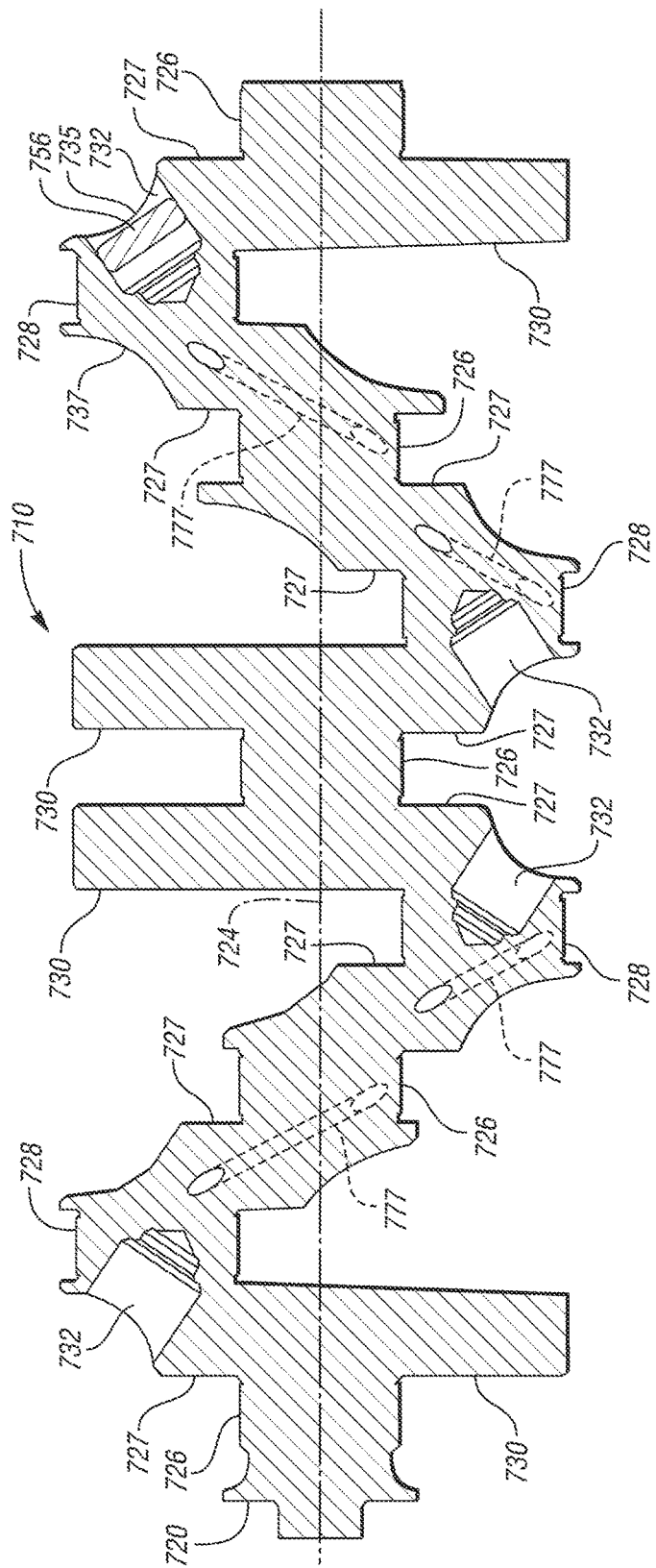
FIG. 13 is a schematic cross-sectional illustration of a crankshaft assembly showing cavities in pin bearing journals and partially assembled with a core plug in one of the cavities.

FIG. 13 shows another embodiment of a crankshaft assembly 710 that includes a crankshaft 720 with a longitudinal axis 724 and configured with crankpin journals 728 and main bearing journals 726, and with arms 727 and counterweights 730 similar in function and position as arms 27 and counterweights 30 of FIG. 1. In the embodiment shown, the crankshaft 720 is forged steel. After the crankshaft 720 is forged, cavities 732 are drilled into each of the crankpin journals 728. Each cavity 732 extends only partially through the crankpin journal 728 from a first axial side 735 toward a second axial side 737 of the crankpin journal 728. Each cavity 732 opens at only the first axial side 735 and not at the second axial side 737 in the embodiment shown. Because the cavity 732 only extends partially through the crankpin journal 728, the cavity 732 does not intersect or otherwise interfere with drilled fluid passages 777 that extend from a main bearing journal 726 to each of two adjacent pin bearing journals 728.

After the cavities 732 are drilled, a respective core plug 756 is disposed in each cavity 732. In FIG. 13, the crankshaft assembly 710 is not yet completely assembled, as only one of the cavities 732 is shown with a core plug 756 therein. A similar core plug 756 will be disposed in each of the other cavities 732. The core plug 756 may be solid, or may have one or more openings extending at least partially therethrough. For example, the core plug 756 may be configured similarly to any of the core plugs 56A, 156, 256, 356, and 456 and may be disposed and retained in the cavity 732 by any of the methods discussed herein. One or more of the main bearing journals 726 may also have cavities that may be drilled or otherwise created therein, although none are shown in FIG. 13. The main bearing cavities (such as main bearing journal cavities 33 of FIG. 1) in all the crankshaft assembly configurations discussed herein may also have core plugs.

Figure 14:
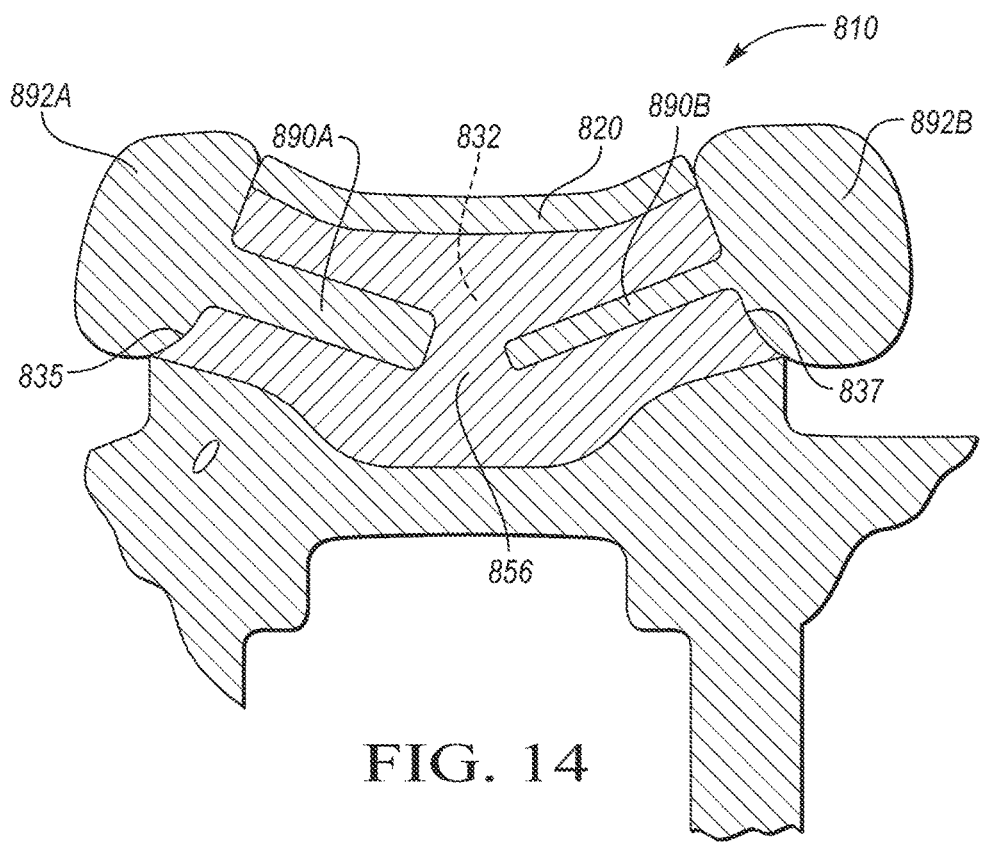
FIG. 14 is a schematic cross-sectional and fragmentary illustration of a pin bearing journal of an embodiment of a crankshaft assembly with an embodiment of a core plug being cast in a cavity of the pin bearing journal and showing die pins.

FIG. 14 shows another embodiment of a crankshaft assembly 810 having a crankshaft 820 with an internal cavity 832. The crankshaft 820 is cast and the internal cavity 832 is provided as described with respect to the cavity 32 of FIG. 2. However, the core plug 856 is then cast in the already formed cavity 832. For example, the core plug 856 is a second material that has a lower melting temperature than the steel crankshaft 820, such as aluminum or an aluminum alloy, and is molten and poured into the cavity 832. Die pins 890A and 890B extend into the cavity 832 and plugs 892A, 892B temporarily plug the cavity 832 as the second material cools and hardens. The die pins 890A, 890B and plugs 892A, 892B are then removed. The completed cast core plug 856 will thus have two openings extending partway therethrough where the die pins 890A, 890B are removed. The die pin 890A is optionally larger in diameter than the die pin 890B. The smaller resulting opening formed by the die pin 890B provides more mass of the core plug 856 nearer the second axial side 837, which may be desired if the second axial side 837 is nearer to a flywheel or a damper to offset inertia effects of the flywheel or damper. The first and second openings at the first and second axial sides 835, 837 need not be machined, as casting of the core plug 856 does not require tight tolerance of the cavity 832 at the openings.

If the material used for a core plug (i.e., the second material referred to herein) has a sufficiently high melting temperature, the core plug could be inserted into the mold assembly of FIG. 9 and cast in place as the crankshaft is cast. For example, if the second material was titanium, which has a relatively high melting temperature, a titanium core plug (i.e., a permanent core plug) together with a partial temporary core (i.e. a sand core or wax core, not shown) could be used instead of the temporary sand or wax core 504 (i.e., instead of a completely temporary core), and could remain in place permanently when the casting process is complete. In one embodiment, such as a cast-in-place core plug (after the temporary core is removed) may have the honeycomb shape of FIG. 8 and be of a partial depth such as in FIG. 2 or FIG. 12. Molten steel of the cast crankshaft in such an embodiment would make the same cavity 32 as before, and air would fill each of the openings 460 after the core sand is shaken out. The overall weight of the crankshaft assembly would still be less than a solid steel crankshaft as titanium has lower density than steel and higher stress capability.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of manufacturing a crankshaft assembly comprising:
configuring a crankshaft with a crankpin journal having a cavity extending at least partially from a first axial side to a second axial side of the crankpin journal and opening at at least one of the first axial side and the second axial side;
disposing a core plug in the cavity; and
retaining the core plug in the cavity by at least one of:
deforming the crankshaft to stake the core plug with the crankshaft; or
inserting a cup plug in the cavity at at least one of the first axial side and the second axial side.

2. The method of claim 1, wherein the crankshaft has a first density and the core plug has a second density less than the first density.

3. The method of claim 2, further comprising
inserting a die pin in the cavity prior to the disposing the core plug in the cavity;
wherein the disposing the core plug in the cavity is by casting the core plug in the cavity around the die pin; and
removing the die pin such that the core plug has a hollow passage where the die pin was removed.

4. The method of claim 1, wherein said configuring the crankshaft with the crankpin journal having a cavity includes drilling the cavity; and
wherein said disposing the core plug in the cavity includes inserting the core plug in the cavity at the at least one of the first axial side and the second axial side of the crankpin journal.

5. The method of claim 1, wherein a midportion of the cavity has a cross-sectional shape that is oval at a cross-section perpendicular to a longitudinal axis of the crankshaft.

6. The method of claim 1, further comprising:
after said disposing the core plug in the cavity, drilling a fluid passage through both the crankshaft and the core plug.

7. The method of claim 1, wherein the core plug has at least one opening extending lengthwise at least partially through the core plug.

8. The method of claim 7, wherein:
the at least one opening has a circular cross-sectional shape;
the at least one opening has a triangular cross-sectional shape; or
the at least one opening includes multiple openings spaced from one another such that the core plug has spokes extending between the multiple openings.

9. The method of claim 1, further comprising:
providing a passage through the core plug prior to disposing the core plug in the cavity; and
after said disposing the core plug in the cavity, drilling a fluid passage through the crankshaft that is aligned with the passage provided in the core plug.

10. The method of claim 1, wherein said disposing the core plug in the cavity comprises:
positioning the core plug on at least one mandrel pin that extends through at least one opening in the core plug; and
pressing the core plug into the cavity by guiding the at least one mandrel pin with the core plug thereon into the cavity.

11. A method of manufacturing a crankshaft assembly comprising:
configuring a crankshaft with a crankpin journal having a cavity extending at least partially from a first axial side to a second axial side of the crankpin journal and opening at at least one of the first axial side and the second axial side;
disposing a core plug in the cavity;
wherein said configuring the crankshaft with the crankpin journal having the cavity is by casting the crankshaft, and further comprising:
prior to said casting, inserting a temporary core in a mold of the crankshaft such that the temporary core fills and creates the cavity in the crankpin journal when the crankshaft is cast;
after said casting, removing the temporary core such that the cavity is hollow; and
machining substantially round openings of the cavity at the first axial side and the second axial side of the cavity such that portions of the cavity at the first and second axial sides are substantially circular.

12. The method of claim 11, wherein the core plug is a first core plug and said disposing the core plug in the cavity includes inserting the first core plug into the cavity at the first axial side of the crankpin journal; and further comprising:
disposing a second core plug at the second axial side of the crankpin journal such that a midportion of the cavity between the first core plug and the second core plug is hollow.

13. The method of claim 11, further comprising:
retaining the core plug in the cavity by at least one of:
deforming the crankshaft to stake the core plug with the crankshaft; or
inserting a cup plug in the cavity at at least one of the first axial side and the second axial side.

14. The method of claim 11, wherein the crankshaft has a first density and the core plug has a second density less than the first density.

15. The method of claim 11, further comprising:
providing a passage through the core plug prior to disposing the core plug in the cavity; and
after said disposing the core plug in the cavity, drilling a fluid passage through the crankshaft that is aligned with the passage provided in the core plug.

16. A method of manufacturing a crankshaft assembly comprising:
configuring a crankshaft with a crankpin journal having a cavity extending at least partially from a first axial side to a second axial side of the crankpin journal and opening at at least one of the first axial side and the second axial side;
disposing a core plug in the cavity;
wherein said disposing the core plug in the cavity includes:
inserting the core plug into a mold of the crankshaft;
inserting a temporary core adjacent to the core plug into the mold;
casting the crankshaft in the mold around the core plug and the temporary core; and
removing the temporary core such that the core plug creates and fills part of the cavity of the crankshaft.

17. The method of claim 16, further comprising:
retaining the core plug in the cavity by at least one of:
deforming the crankshaft to stake the core plug with the crankshaft; or inserting a cup plug in the cavity at at least one of the first axial side and the second axial side.

18. The method of claim 16, wherein the crankshaft has a first density and the core plug has a second density less than the first density.

19. The method of claim 16, further comprising:
providing a passage through the core plug prior to disposing the core plug in the cavity; and
after said disposing the core plug in the cavity, drilling a fluid passage through the crankshaft that is aligned with the passage provided in the core plug.

* * * * *